United States Patent [19]
Sloter

[11] 3,716,152
[45] Feb. 13, 1973

[54] VEHICLE TOWING MEANS

[76] Inventor: James W. Sloter, 514 E. Chubb, Algona, Iowa

[22] Filed: April 30, 1971

[21] Appl. No.: 139,086

[52] U.S. Cl. ................................214/86 A, 280/402
[51] Int. Cl. .................................................B60p 3/12
[58] Field of Search ...214/86 A; 280/402; 254/139.1

[56] References Cited

UNITED STATES PATENTS

| | | | |
|---|---|---|---|
| 2,951,601 | 9/1960 | Castoe | 214/86 A |
| 2,603,370 | 7/1952 | Hanzel | 214/86 A |
| 2,913,131 | 11/1959 | Holmes | 214/86 A |
| 3,620,393 | 11/1971 | Bubik | 214/86 A |
| 2,644,595 | 7/1953 | Levan | 214/86 A |

*Primary Examiner*—Albert J. Makay
*Attorney*—Zarley, McKee & Thomte

[57] ABSTRACT

A means for towing a vehicle comprising a frame means which is positioned on the floor of a truck bed with a sub-frame means being pivotally connected at its forward end to the forward end of the frame means. A normally horizontally disposed deck means is secured to the sub-frame means and extends thereover and the frame means and is spaced above the floor of the truck bed. The sub-frame means includes a tow frame member which is selectively movably mounted on the sub-frame means between stored and operative positions. The rearward end of the tow frame member is received between the deck means and the floor of the truck bed portion when in its stored position and is positioned rearwardly of the truck when in its operative position. Connection means is provided on the rearward end of the tow frame member for securing the vehicle to be towed thereto. A hydraulic cylinder means is connected to the sub-frame means for pivoting the sub-frame means about its forward end to permit the rearward end of the tow frame member to be selectively raised and lowered to raise and lower one end of the vehicle to be towed. A closure means closes the rearward end of the frame means when the tow frame member is in its stored position so that the bed portion of the vehicle may be used for other purposes when a vehicle is not being towed.

6 Claims, 5 Drawing Figures

PATENTED FEB 13 1973

3,716,152

INVENTOR
JAMES W. SLOTER
BY
Zarley, McKee & Thomte
ATTORNEYS

VEHICLE TOWING MEANS

Tow trucks or the like usually employ an upstanding frame means or the like at the rearward end of the truck which prevents the truck from being used for other purposes when the truck is not towing a vehicle.

Therefore, it is a principal object of this invention to provide a means for towing a vehicle.

A further object of this invention is to provide a means for towing a vehicle which is mounted in the bed portion of a truck and which permits the bed portion to be used for other purposes when a vehicle is not being towed.

A further object of this invention is to provide a means for towing a vehicle including means for storing the tow frame member in an inoperative position.

A further object of this invention is to provide a means for towing a vehicle which may be adapted to accommodate various vehicle models.

A further object of this invention is to provide a means for towing a vehicle which is compact.

A further object of this invention is to provide a means for towing a vehicle which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

Figure 2:
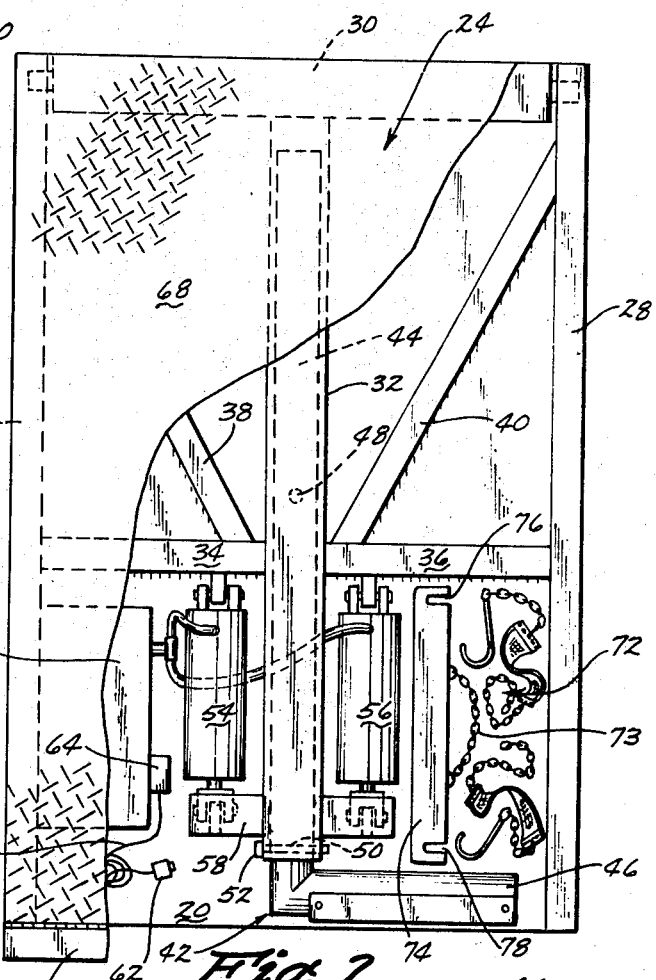
FIG. 2 is a top elevational view of the means of this invention with portions thereof cut away to more fully illustrate the invention.

The numeral 10 generally designates a conventional truck having a bed portion 12 comprising side walls 14 and 16, front wall 18, floor 20 and pivotal tail gate 22. The numeral 24 refers generally to the towing means of this invention which is adapted to be positioned in the bed portion 12 and which is adapted to be rigidly secured to the floor 20 by any convenient means such as bolts or the like. A pair of spaced apart frame members 26 and 28 are positioned adjacent the sides 14 and 16 respectively and have a cross frame member 30 pivotally connected to the forward ends thereof as seen in FIG. 2. An elongated hollow tube 32 is secured at its forward end to frame member 30 at the center thereof by welding or the like and extends rearwardly therefrom as seen in FIG. 2.

Reinforcing braces 34, 36, 38 and 40 are secured to the frame members 26 and 28 to strengthen the apparatus. A tow frame member 42 has a frame portion 44 slidably and rotatably mounted in the tube 32 with frame portion 46 extending transversely from the rearward end thereof.

Frame portion 44 has transversely disposed openings 48 and 50 extending therethrough which are adapted to register with openings formed in the rearward end of tube 32 so that pin 52 can be extended therethrough to lock the tow frame member 42 in stored and operative positions.

Hydraulic cylinders 54 and 56 are pivotally connected at their forward ends to the braces 34 and 36 respectively and are pivotally connected at their rod ends to a cross member 58 which is secured to the rearward end of tube 32. Cylinders 54 and 56 are fluidly connected to an electrically operated hydraulic pump means 60 which is driven from the vehicle electrical system. Control means 62 is electrically connected to the electrical pump actuating solenoid 64 by control wire 66. A steel deck plate 68 is welded to cross frame member 30 and tube 32 and extends thereover and over the frame members 26 and 28 as seen in FIG. 2 to provide a "false" bottom for the bed portion of the vehicle when the apparatus is not being used to tow a vehicle. A closure means 70 such as an I-beam is hingedly secured at its upper end to the rearward end of deck plate 68 to permit the end of the apparatus to be closed so that the bed portion of the truck may be used for other purposes such as hauling grain or the like without fear of the grain finding its way into the internal components of the apparatus.

Figure 5:
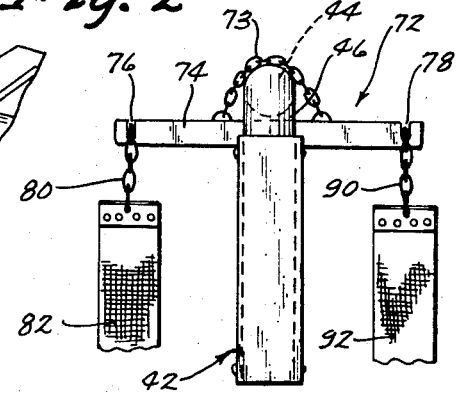
FIG. 5 is a partial rear plan view of the tow frame member and connection means.

The numeral 72 generally refers to a connection means which may be mounted on the rearward end of tow frame member 42 as illustrated in FIG. 5. Connection means 72 comprises a yoke chain 73 and a yoke arm 74 secured thereto and having notches 76 and 78 formed in its upper outer ends thereof. The connection means 72 may be removably mounted on the tow frame member 42 with yoke chain 73 extending over the rearward end of frame portion 44 and yoke arm being positioned therebelow forwardly of frame portion 46. Chain 80 is selectively receivable in notch 76 and has a flexible belt 92 secured thereto. Chain 84 is secured to the other end of belt 82 and has a hook 86 provided thereon for attachment to the axle 88 of the vehicle to be towed. Chain 90 is selectively receivable in the notch 78 and has flexible belt 92 secured thereto. Chain 94 is secured to belt 92 with hook 96 being provided thereon for attachment to the axle 88. A plastic guard 98 is provided on frame portion 46 to prevent damage to the bumper of the vehicle being towed.

Figure 1:
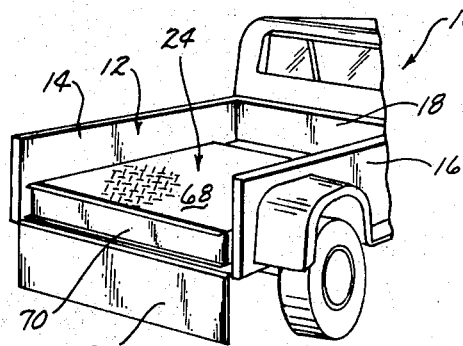
FIG. 1 is a partial rear perspective view of a truck having the means of this invention mounted in the bed portion thereof.
Figure 3:
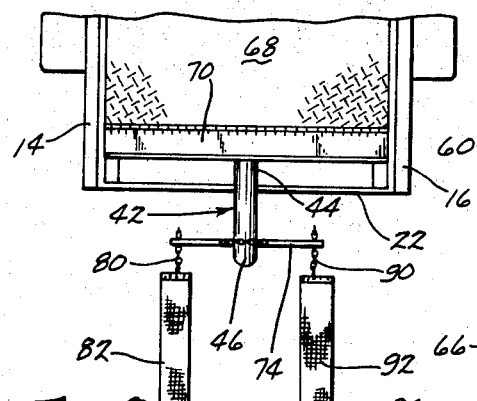
FIG. 3 is a partial plan view of the rearward end of the means of this invention.

The normal method of operation is as follows: When it is desired to tow a vehicle, the tail gate 22 is swung downwardly to the position of FIG. 1. The closure means 70 is then pivoted about its upper end to permit the operator to reach the tow frame member 42. As seen in FIG. 2, the tow frame member 42 is positioned between the floor 20 and the deck plate 68 when in its stored position. The operator simply removes the pin 52 and grasps the frame portion 46 and moves the tow frame member 42 rearwardly from the position of FIG. 2 to the position of FIG. 3. The tow frame member is then oriented so that the frame portion 46 extends downwardly from the rearward end of frame portion 44. Pin 52 is then inserted through opening 48.

Figure 4:
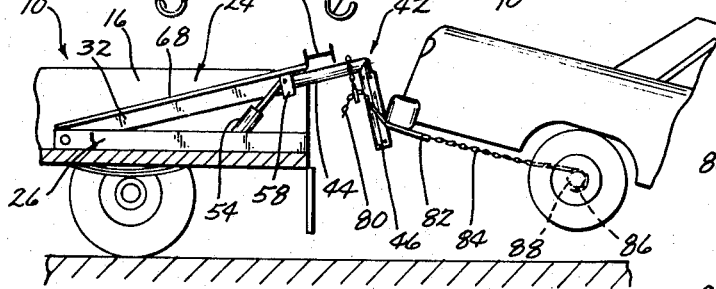
FIG. 4 is a side view of the means of this invention towing a vehicle with portions of the truck being cut away to more fully illustrate the invention.

The connection means 72 is then mounted on the tow frame member 42 as illustrated in FIG. 5. Hooks 86 and 96 are then secured to the axle 88. The hydraulic cylinders 54 and 56 are then actuated through the control means 62 which causes the extension of the rods therefrom. The extension of the rods from the cylinders 54 and 56 causes the rearward end of the tube 32 to be raised upwardly to the position seen in FIG. 4 which causes the rearward end of the vehicle 98 to be raised from the ground so that the vehicle may be towed.

When the vehicle has been towed to the desired location, the hydraulic cylinders 54 and 56 are operated to cause the withdrawal of the rods thereinto so that the rearward end of the tow frame member 42 is lowered thereby lowering the rearward end of the vehicle 98 into ground engagement. Chains 80 and 90 are removed from notches 76 and 78 and hooks 86 and 96 are detached from the axle 86. The connection means 72 is then stored as shown in FIG. 2. Pin 52 is then removed to permit frame portion 46 to be moved from its vertically disposed position to a horizontally disposed position with pin 52 then being replaced. Frame portion 46 may then be received between the deck plate 68 and the floor 20 of the truck as seen in FIG. 2. The control wire 66 and the control means 62 are also positioned in the storage area and the closure means 70 is permitted to close to the position of FIG. 1. The tail gate 22 may then be raised to its closed position so that the bed portion 12 of the truck 10 can be used for other purposes when a vehicle is not being towed. The deck plate 68 provides a "false" bottom and the entire apparatus is extremely compact which permits the bed portion 12 to be used for other purposes as previously described.

Thus it can be seen that an extremely unique towing means has been provided which permits a vehicle to be conveniently towed while permitting the towing truck to be used for other purposes when not being employed to tow a vehicle. Thus it can be seen that the device of this invention accomplishes at least all of its stated objectives.

I claim:

1. In combination with a vehicle having rearward and forward ends, and a bed portion at its rearward end, comprising, a frame means on said bed portion having rearward and forward ends, a sub-frame means having rearward and forward ends and being pivotally connected about a horizontal axis at its forward end to said frame means adjacent the forward end thereof, a normally horizontally disposed deck means secured to said sub-frame means extending over said sub-frame means and said frame means spaced above said bed portion, said sub-frame means including a tow frame member having rearward and forward ends which is selectively movably mounted on said sub-frame means between stored and operative positions, the rearward end of said tow frame member being positioned between said deck means and said bed portion when in its stored position and being positioned rearwardly of the vehicle when in its operative position, means on the rearward end of said tow frame member for supporting the vehicle to be towed thereon, and means for pivotally moving said sub-frame means with respect to said frame means so that the rearward end of said tow frame member may be selectively raised and lowered to respectively raise and lower one end of the vehicle to be towed, said sub-frame means comprising a cross frame member which is pivotally connected to said frame means, a hollow tube means secured to said cross frame member and extending rearwardly therefrom, said tow frame member being slidably mounted in said hollow tube means, said tow frame member being L-shaped and comprising a first frame portion slidably and rotatably received in said hollow tube means and a second frame portion extending transversely from the rearward end of said first frame portion.

2. The combination of claim 1 wherein locking means is provided on said hollow tube means for selective engagement with said first frame portion to selectively maintain said first frame portion in a predetermined rearwardly extended position.

3. The combination of claim 1 wherein a closure means selectively closes the rearward end of said frame means between said deck means and the floor of said vehicle bed portion when said sub-frame means is in its stored position.

4. In combination with a vehicle having rearward and forward ends, and a bed portion at its rearward end, comprising, a frame means on said bed portion having rearward and forward ends, a sub-frame means having rearward and forward ends and being pivotally connected about a horizontal axis at its forward end to said frame means adjacent the forward end thereof, a normally horizontally disposed deck means secured to said sub-frame means extending over said sub-frame means and said frame means spaced above said bed portion, said sub-frame means including a tow frame member having rearward and forward ends which is selectively movably mounted on said sub-frame means between stored and operative positions, said tow frame member being L-shaped comprising a first frame portion operatively slidably and rotatably mounted on said sub-frame means and a second frame portion extending transversely from the rearward end of said first frame portion, said second frame portion being positioned between said deck means and said bed portion when in its stored position and being positioned rearwardly of the vehicle when in its operative position, said second frame portion extending downwardly from the rearward end of said first frame position when in its operative position, means on the rearward end of said tow frame member for supporting the vehicle to be towed thereon, and means for pivotally moving said sub-frame means with respect to said frame means so that the rearward end of said tow frame member may be selectively raised and lowered to respectively raise and lower one end of the vehicle to be towed.

5. The combination of claim 4 wherein said sub-frame means comprises a cross frame member which is pivotally connected to said frame means, a hollow tube means secured to said cross frame member and extending rearwardly therefrom, said first frame portion of said tow frame member being slidably and rotatably mounted in said hollow tube means.

6. The combination of claim 4 wherein said means on the rearward end of said tow frame member comprises a yoke means detachably mounted thereon adapted to be operatively connected to the axle of the vehicle to be towed, said second frame portion engaging the said one end of the vehicle to be towed when the said one end has been raised out of ground engagement.

* * * * *